(12) United States Patent
Hwang et al.

(10) Patent No.: US 12,038,337 B2
(45) Date of Patent: Jul. 16, 2024

(54) OPTICAL FIBER-BASED SENSOR MODULE AND STRAIN SENSOR DEVICE COMPRISING THE SAME

(71) Applicant: KOREA INSTITUTE OF SCIENCE AND TECHNOLOGY, Seoul (KR)

(72) Inventors: Donghyun Hwang, Seoul (KR); Min Woo Lee, Seoul (KR)

(73) Assignee: Korea Institute of Science and Technology, Seoul (KR)

(*) Notice: Subject to any disclaimer, the term of this patent is extended or adjusted under 35 U.S.C. 154(b) by 172 days.

(21) Appl. No.: 17/749,888

(22) Filed: May 20, 2022

(65) Prior Publication Data

US 2023/0102450 A1 Mar. 30, 2023

(30) Foreign Application Priority Data

Sep. 29, 2021 (KR) .................. 10-2021-0128659

(51) Int. Cl.
*G01L 1/24* (2006.01)
*G02B 6/26* (2006.01)
*G02B 6/32* (2006.01)

(52) U.S. Cl.
CPC .............. *G01L 1/242* (2013.01); *G02B 6/262* (2013.01); *G02B 6/32* (2013.01)

(58) Field of Classification Search
CPC ..... G02B 6/262; G02B 6/32; G01L 1/24–248; G01D 5/26; G01D 5/32; G01D 5/34; G01D 5/353–35396; G01B 11/00–306
See application file for complete search history.

(56) References Cited

U.S. PATENT DOCUMENTS 6,302,593 B1 * 10/2001 Haake .................. G02B 6/4226
                                                      385/74
7,248,762 B2 * 7/2007 Hallemeier ............. H04J 14/04
                                                      398/143
(Continued)

FOREIGN PATENT DOCUMENTS

CN          100340839 C  * 10/2007
JP          2004-6638 A    1/2004
(Continued)

OTHER PUBLICATIONS

K. Tian et al., "A Curvature Sensor Based on Twisted Single-Mode-Multimode-Single-Mode Hybrid Optical Fiber Structure," in Journal of Lightwave Technology, vol. 35, No. 9, pp. 1725-1731, May 1, 2017, doi: 10.1109/JLT.2017.2650941. (Year: 2017).*

(Continued)

*Primary Examiner* — Michelle R Connelly
*Assistant Examiner* — Emma R. Oxford
(74) *Attorney, Agent, or Firm* — NSIP Law (57) ABSTRACT

The present disclosure relates to a sensor module for measuring a displacement occurring in a sensor by a confocal principle, a strain sensor device comprising the same, and a method for measuring a strain in a target using the same. Specifically, the sensor module according to an embodiment of the present disclosure includes a first single-mode optical fiber, a first GRIN optical fiber, a multi-mode optical fiber, a second GRIN optical fiber and a second single-mode optical fiber connected in an axial direction, wherein light inputted through the first single-mode optical fiber is transmitted to the second single-mode optical fiber through the series of optical fibers, and light forming a focal point in the core of the second single-mode optical fiber is detected using a confocal principle.

13 Claims, 8 Drawing Sheets

(56) References Cited

U.S. PATENT DOCUMENTS

| | | |
|---|---|---|
| 8,923,955 B2 | 12/2014 | Thiberville et al. |
| 10,161,740 B1 | 12/2018 | Takei et al. |
| 10,837,804 B2* | 11/2020 | Bickham ............ G01D 5/35351 |
| 11,060,917 B2 | 7/2021 | Kuga |
| 2002/0146202 A1* | 10/2002 | Reed ........................ G02B 6/14 385/34 |
| 2004/0179789 A1 | 9/2004 | Shi |
| 2005/0169584 A1* | 8/2005 | Takimoto ............. G02B 6/2746 385/94 |
| 2007/0036491 A1 | 2/2007 | Suzuki et al. |
| 2017/0227410 A1* | 8/2017 | Abedin ................... G01L 1/242 |
| 2021/0041227 A1* | 2/2021 | Van der Mark ....... G01B 11/24 |

FOREIGN PATENT DOCUMENTS

| | | |
|---|---|---|
| JP | 2009205151 A * | 9/2009 |
| JP | 2019-527091 A | 9/2019 |
| KR | 10-1257100 B1 | 4/2013 |
| KR | 10-1862131 B1 | 5/2018 |
| WO | WO 2005/124415 A1 | 12/2005 |
| WO | WO 2006/037132 A1 | 4/2006 |
| WO | WO 2018/009529 A1 | 1/2018 |

OTHER PUBLICATIONS

Machine translation of CN-100340839-C. (Year: 2007).*
Machine translation of JP-2009205151-A. (Year: 2009).*
Patrick, H. J., et al. "Hybrid Fiber Bragg Grating/Long Period Fiber Grating Sensor for Strain/Temperature Discrimination." IEEE Photonics Technology Letters 8.9 (1996): 1223-1225.
Gong, Yuan, et al. "All-Fiber Curvature Sensor Based on Multimode Interference." IEEE Photonics Technology Letters 23.11 (2011): 679-681.
Zhao, Huichan, et al. "Optoelectronically Innervated Soft Prosthetic Hand via Stretchable Optical Waveguides." Science robotics 1.1 (2016): eaai7529, (10 pages in English).
Wang, Ruihang, et al. "Wearable Respiration Monitoring Using an In-line Few-mode Fiber Mach-Zehnder Interferometric Sensor." Biomedical optics express 11.1 (2020): 316-329.

* cited by examiner

OPTICAL FIBER-BASED SENSOR MODULE AND STRAIN SENSOR DEVICE COMPRISING THE SAME

DESCRIPTION OF GOVERNMENT-SPONSORED RESEARCH AND DEVELOPMENT

This research is conducted under the support of Personal Basic Research (Ministry of Science and Technology) R&D, [Development of tactile/reactive sensor and variable rigidity palm-based object shape and flexible adaptive robot hand, Project Serial No.: 1711139862, detailed Serial No.: 2020R1A2C2100193] of Ministry of Science and ICT.

CROSS-REFERENCE TO RELATED APPLICATION

This application claims priority to Korean Patent Application No. 10-2021-0128659, filed on Sep. 29, 2021, and all the benefits accruing therefrom under 35 U.S.C. § 119, the contents of which in its entirety are herein incorporated by reference.

BACKGROUND

1. Field

The present disclosure relates to an optical fiber-based sensor module, and more particularly, to an optical fiber-based sensor module for sensing a strain in a target by measuring a curvature occurred in the sensor module by the confocal principle and a strain sensor device comprising the same.

2. Description of the Related Art

Recently, with the extensive research in the industry of wearable robots and healthcare devices, there is a growing need for the development of small affordable sensors suitable for the use thereof.

In the case of the conventional electronic sensors using electrical signals, signal attenuation and distortion occurs due to electric-magnetic interactions and affects the precision of measurements. In contrast, as opposed to the electronic sensors, optical fiber-based sensors using optical communication are not influenced by a magnetic field and suffer little signal delay or distortion, and thus they are used in a wide range of strain sensor applications. The conventional optical fiber-based sensors include a fiber grating sensor such as a fiber Bragg grating (FBG) sensor and a long period fiber Bragg (LPFG) sensor, an interferometer, a power loss or the like. Patent Literature 1 (Korean Patent No. 10-1862131 (published on May 30, 2018)) discloses a strain sensor device using a FBG sensor.

However, the conventional optical fiber-based sensors need relatively large and high-cost components for operation due to the measuring principle, and thus have limitations in terms of small size and wide use of the device and do not have sufficient precision.

SUMMARY

The present disclosure is developed to overcome the limitations of the prior art, and therefore the present disclosure is directed to providing an optical fiber-based sensor module that can be produced in light-weight and compact design with improved precision at an affordable price and a strain sensor device comprising the same.

The present disclosure is further directed to providing a sensor module made of a flexible material to sense various strains in a target such as bending and twist with high precision of measurements in wearable robot and healthcare device applications and a strain sensor device comprising the same.

To achieve the above-described object, the present disclosure provides an optical fiber-based sensor module 1 for sensing a strain in a target, including a first single-mode optical fiber; a first gradient-index (GRIN) optical fiber 12; a multi-mode optical fiber 13; a second GRIN optical fiber 14; and a second single-mode optical fiber 15 continuously coupled in an axial direction, wherein the first GRIN optical fiber 12 is configured to receive light input to the first single-mode optical fiber 11 and output it in a form of a parallel beam; the multi-mode optical fiber 13 is configured to transmit the parallel beam of light to the second GRIN optical fiber 14; and the second GRIN optical fiber 14 is configured to output the received light to form a focal point in the second single-mode optical fiber 15.

Additionally, according to a first embodiment of the present disclosure, there may be provided a strain sensor device 100 using the optical fiber-based sensor module 1, including a light source 3 to generate a laser light; a coupler 4 connected to the light source 3 to receive the laser light and output it into first light and second light; a first detector 6 connected to the coupler 4 to receive the first light and measure an intensity of the first light; the sensor module 1 including a first single-mode optical fiber 11; a first GRIN optical fiber 12; a multi-mode optical fiber 13; a second GRIN optical fiber 14; and a second single-mode optical fiber 15 continuously coupled in an axial direction, wherein the first single-mode optical fiber 11 is connected to the coupler 4 to receive the second light, and the second single-mode optical fiber 15 receives at least part of the second light; and a second detector 7 connected to the second single-mode optical fiber 15 to receive the light outputted from the second single-mode optical fiber 15 and measure an intensity of the light.

Additionally, according to a second embodiment of the present disclosure, there may be provided a strain sensor device 100 using the optical fiber-based sensor module 1, including a light source 3 to generate a laser light; a coupler 4 connected to the light source 3 to receive the laser light and output it into first light and second light; a first detector 6 connected to the coupler 4 to receive the first light and measure an intensity of the first light; a circulator 5 including 'Port a' connected to the coupler 4 to receive the second light; or 'Port b' to which the light input to the 'Port a' is transmitted; and 'Port c' to which the light input to the 'Port b' is transmitted; the sensor module 1 including a first single-mode optical fiber 11; a first GRIN optical fiber 12; a multi-mode optical fiber 13; a second GRIN optical fiber 14; and a second single-mode optical fiber 15 continuously coupled in an axial direction, wherein the first single-mode optical fiber 11 is connected to the 'Port b' of the circulator 5 to receive the second light and the second single-mode optical fiber 15 is a free end type having a reflection member 160 at an end; and a second detector 7 connected to the second single-mode optical fiber 15 to receive the light outputted from the second single-mode optical fiber 15 and measure an intensity of the light.

In the embodiments of the present disclosure, the strain sensor device 100 may further include an information processing device 8 to calculate a curvature C occurred in the sensor module 1 by processing measurement data of the first detector 6 and the second detector 7.

In the embodiments of the present disclosure, the optical fibers 11, 12, 13, 14, 15 of the sensor module 1 may include cores 110, 120, 130, 140, 150 and claddings 115, 125, 135, 145, 155 which cover the cores, respectively, the light input to the first single-mode optical fiber 11 may be transmitted through the cores 110, 120, 130, 140, 150 of the optical fibers 11, 12, 13, 14, 15, and only light forming a focal region at the core 150 may be inputted to the second single-mode optical fiber 15. Additionally, the optical fibers 11, 12, 13, 14, 15 may further include a flexible protective coating 17 configured to cover the claddings 115, 125, 135, 145, 155.

Additionally, the present disclosure may provide a method for sensing a strain in a target using the strain sensor module 1 device of the first embodiment, the method including generating and outputting, by the light source 3, a laser light; outputting, by the coupler 4, the laser light into first light and second light; receiving, by the first detector 6, the first light and measuring an intensity of the first light; transmitting, by the sensor module 1, the second light input to the first single-mode optical fiber 11 to the second single-mode optical fiber 15; outputting, by the second single-mode optical fiber 15, the input light forming a focal point in the core 150 of the second single-mode optical fiber 15; and receiving, by the second detector 7, the light outputted from the second single-mode optical fiber 15 and measuring an intensity of the light.

Additionally, the present disclosure may provide a method for sensing a strain in a target using the strain sensor module 1 device of the second embodiment, the method including generating and outputting, by the light source 3, a laser light; outputting, by the coupler 4, the laser light into first light and second light; measuring, by the first detector 6, an intensity of the first light; receiving, by the circulator 5, the second light through the 'Port a' and outputting it to the sensor module 1 through the 'Port b'; transmitting, by the sensor module 1, the second light input to the first single-mode optical fiber 11 to the second single- mode optical fiber 15; outputting, by the second single-mode optical fiber 15, the input light forming a focal point in the core 150 of the second single-mode optical fiber 15; allowing the light outputted from the second single-mode optical fiber 15 to be reflected by the reflection member 160, pass through the sensor module 1 and be inputted again through the 'Port b'; outputting, by the circulator 5, the reflected light inputted through the 'Port b' to the 'Port c'; and receiving, by the second detector 7, the reflected light and measuring an intensity of the reflected light.

In the methods according to the embodiments of the present disclosure, transmitting, by the sensor module 1, the second light input to the first single-mode optical fiber 11 to the second single-mode optical fiber 15 may include receiving, by the first single-mode optical fiber 11, the second light and outputting it to the first GRIN optical fiber 12; outputting, by the first GRIN optical fiber 12, the received light to the multi-mode optical fiber 13 in a form of a parallel beam; receiving, by the multi-mode optical fiber 13, the parallel beam of light and outputting it to the second GRIN optical fiber 14; and outputting, by the second GRIN optical fiber 14, the received light to form a focal point in the second single-mode optical fiber 15. Additionally, the methods according to the embodiments of the present disclosure may further include calculating, by the information processing device 8, a curvature C occurred in the sensor module 1 by processing measurement data of the first detector 6 and the second detector 7.

According to the sensor module of the present disclosure, since it allows light to enter and exit through the single-mode optical fiber in which light propagates in one mode, it is possible to reduce light losses and minimize the influence of modal dispersion, thereby improving the precision and repeatability of measurements compared to the conventional optical fiber-based sensors such as the power loss without using a single-mode optical fiber.

The sensor module of the present disclosure is simple and easy to fabricate since its components, namely, optical fibers are joined together by the fusion splicing method. Additionally, compared to the above-described fiber grating sensor or interferometer, the strain sensor device of the present disclosure does not need the expensive light source and detector, thereby reducing fabrication cost.

The sensor module of the present disclosure is made of a flexible material and can deform in response to the strain in the target, and thus is suitable for use in wearable robots that need to sense strains such as bending at the joint part of the human body. Additionally, since it uses the principle of sensing the strain by monitoring changes in light intensity measurements caused by defocusing of two focal points formed in the sensor by the strain in the target, there is no need for large volume devices such as a broadband source and an interrogator, and thus it is possible to reduce the size and weight of the device. Accordingly, the sensor module according to the present disclosure and the strain sensor device comprising the same are more suitable for use in the field of wearable robots and healthcare devices requiring low-cost lightweight and small affordable sensors, compared to the conventional electronic sensors which have the limited sensor size and are not flexible and the conventional optical fiber-based sensors having a high cost and a large volume.

DETAILED DESCRIPTION

Hereinafter, exemplary embodiments of the present disclosure will be described in more detail with reference to the accompanying drawings. Although the present disclosure is described with reference to the embodiments shown in the drawings, it is described as an embodiment, and the technical spirit of the present disclosure and its essential elements and operations are not limited thereby.

The term "target" as used herein refers to an object such as a human, an animal, a machine and a robot in which a sensor module according to embodiments of the present disclosure may be used to sense strains. The term "confocal principle" as used herein refers to a principle of sensing a strain in the target by forming two focal points in an optical fiber and detecting a change in light intensity measurement when a displacement occurs between the two focal points. The term "measurement data of a first detector and a second detector" as used herein refers to intensity data of first light and second light measured by the first detector and the second detector, respectively.

Figure 1:
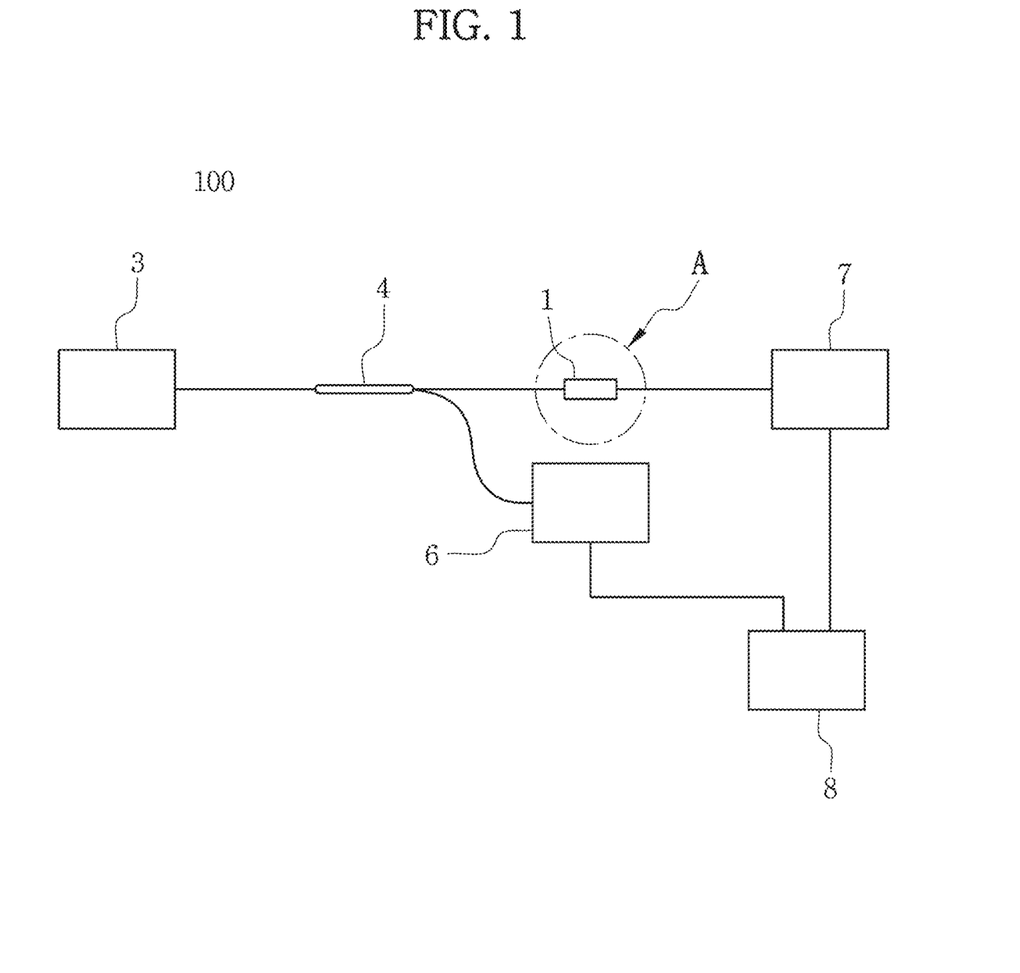
FIG. 1 is a schematic conceptual diagram of a strain sensor device according to an embodiment of the present disclosure.
Figure 2:
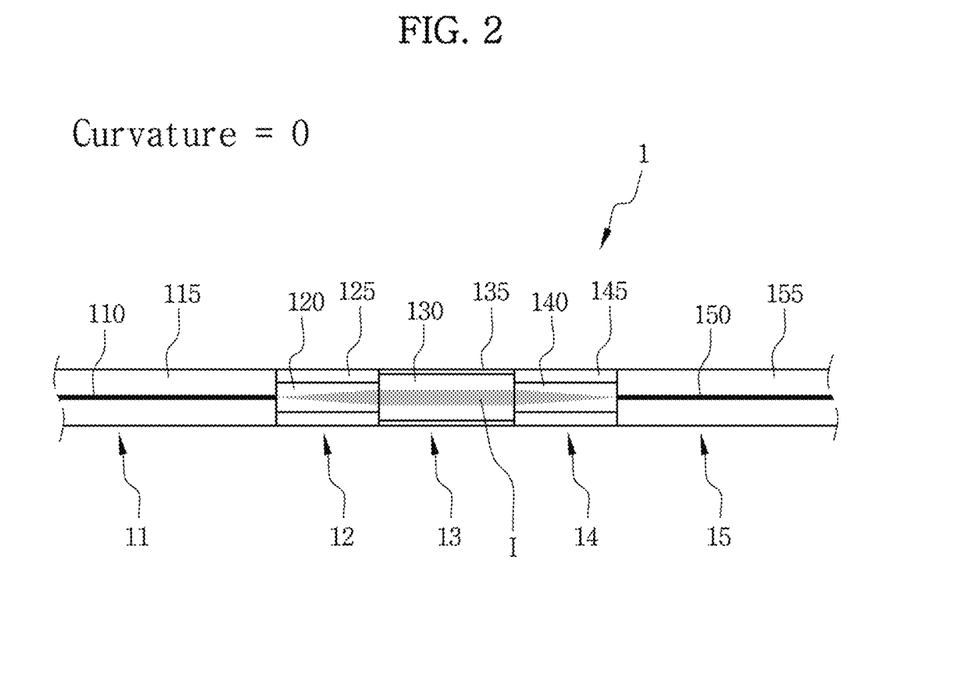
FIG. 2 is a schematic enlarged cross-sectional diagram of circle A showing a sensor module of FIG. 1.

FIG. 1 is a schematic conceptual diagram of a strain sensor device 100 according to an embodiment of the present disclosure. FIG. 2 is a schematic enlarged cross-sectional diagram of circle A showing a sensor module 1 of FIG. 1, and FIG. 3 is a schematic enlarged cross-sectional view of the sensor module 1 when strain occurred in the target.

The sensor module 1 of the present disclosure is configured to sense the strain in the target by measuring all physical quantities that may cause the strain to occur in the target, and the present disclosure will be described with regard to embodiments of measuring the physical quantities, particularly, a curvature. The strain sensor device 100 of the present disclosure is configured to sense the strain in the target by detecting a change in intensity of light outputted from the sensor module 1 by the confocal principle and calculating the curvature using the optical fiber-based sensor module 1.

Hereinafter, the sensor module 1 will be described first.

Figure 3:
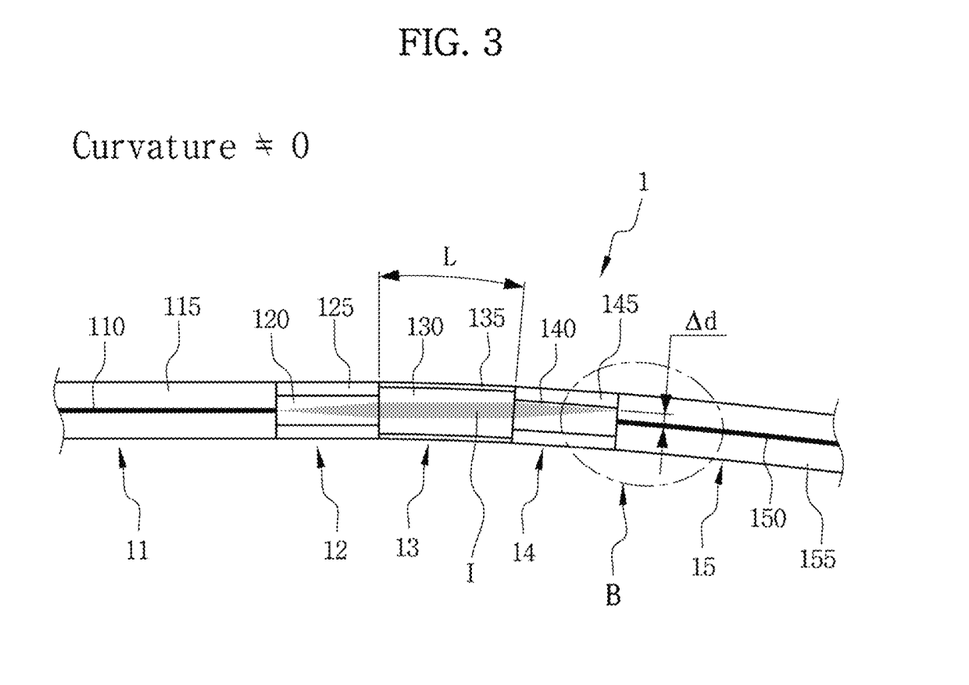
FIG. 3 is a schematic enlarged cross-sectional view of FIG. 1, showing the sensor module when strain occurred in a target.

In an embodiment, as shown in FIGS. 2 and 3, the sensor module 1 may include a first single-mode optical fiber, a first gradient-index (GRIN) optical fiber, a multi-mode optical fiber, a second GRIN optical fiber 14 and a second single-mode optical fiber 15 (hereinafter referred to as "optical fibers") arranged in that order and connected in the axial direction. As described above, in the embodiments of the present disclosure, the sensor module 1 preferably has the single-mode optical fiber at each of two ends. When light enters and exits the sensor module 1 through the single-mode optical fibers in which light propagates in one mode, it is possible to reduce light losses and minimize the influence of modal dispersion, thereby improving precision and repeatability of measurements. The first and second single-mode optical fibers 11, 15 are preferably formed with a relatively large diameter and connected with the multi-mode optical fiber 13.

The optical fibers of the sensor module 1 may include a core which extends in the lengthwise direction and guides light, and a cladding which covers the outer circumference of the core and is made of a material having a smaller refractive index than the core. In the drawings, the core, the cladding and the coating of the first single-mode optical fiber 11 are indicated as 110, 115 and 117 respectively, the core and the cladding of the first GRIN optical fiber 12 are indicated as 120 and 125 respectively, the core and the cladding of the multi-mode optical fiber 13 are indicated as 130 and 135 respectively, the core and the cladding of the second GRIN optical fiber 14 are indicated as 140 and 145 respectively, and the core, the cladding and the coating of the second single-mode optical fiber 15 are indicated as 150, 155 and 157 respectively. Additionally, in the drawings, light is indicated as I.

Due to a difference in refractive index between the core and the cladding of each optical fiber, a laser light input to the first single-mode optical fiber 11 propagates with repeated total reflection at the boundary and exits the second single-mode optical fiber 15. In this embodiment, the light propagation direction is a direction from the first single-mode optical fiber 11 toward the second single-mode optical fiber 15, but may be the contrary direction. By the sensor module 1 of the present disclosure, the precision and repeatability of measurements is superior over the conventional optical fiber-based sensors such as the power loss without using a single-mode optical fiber.

The first and second GRIN optical fibers 12, 14 are a type of multi-mode optical fiber having the increasing refractive index as it goes toward the center of the core, and act as a lens that converges or diverges the received light. In this embodiment, the first GRIN optical fiber 12 diverges the second light received from the first single-mode optical fiber 11 and outputs it in the form of a parallel beam as shown in FIG. 2. Additionally, the second GRIN optical fiber 14 converges the parallel beam of light received from the multi-mode optical fiber 13 and outputs it to form a focal point as shown in FIG. 2.

Figure 5:
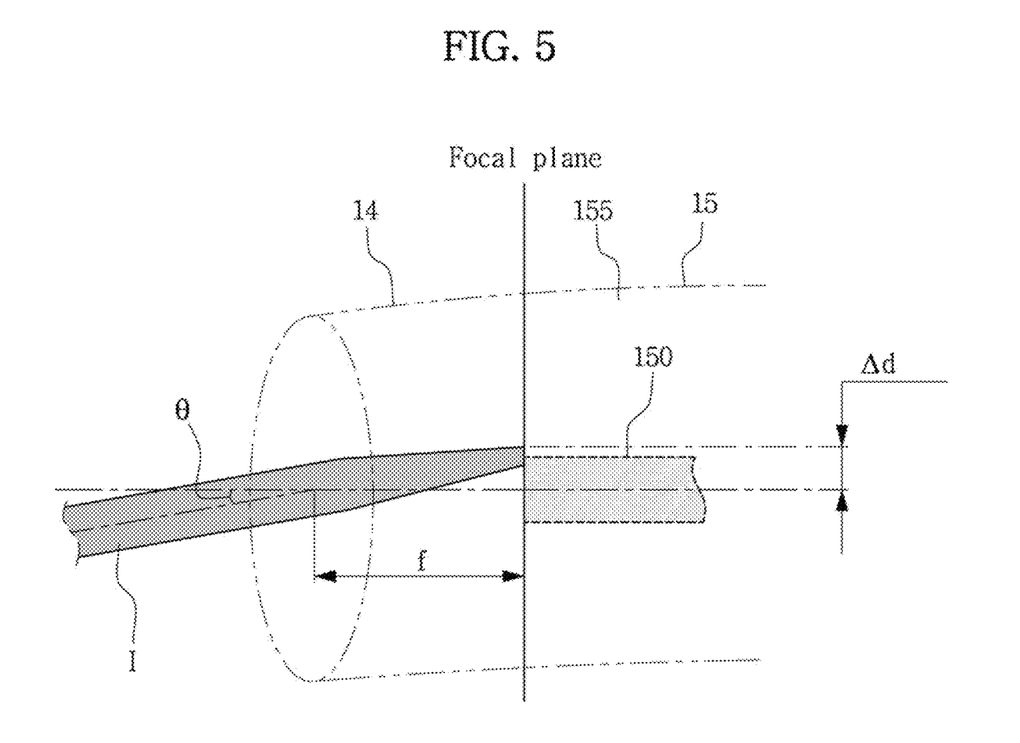
FIG. 5 is a conceptual diagram of circle B in FIG. 3 showing a displacement occurred in the sensor module.

Depending on the length settings of the first GRIN optical fiber 12, the first GRIN optical fiber 12 may output the parallel beam of light that is less divergent or more divergent than this embodiment. In this case, the second GRIN optical fiber 14 focuses light less or more than this embodiment to form a focal region rather than a point in the second single-mode optical fiber 15. FIG. 3 depicts the sensor module 1 bent more than FIG. 5 in an exaggerated way. FIG. 5 shows the focal region formed in the second single-mode optical fiber 15 due to less convergence to the focal point.

Figure 4:
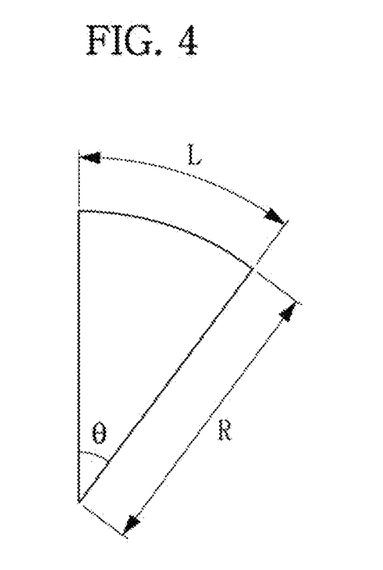
FIG. 4 is a conceptual diagram showing a curvature occurred in the sensor module of FIG. 3.

Hereinafter, the method for sensing the strain in the target by the confocal principle will be described. As shown in FIG. 5, one of the two focal points formed in the optical fiber mentioned above corresponds to the center of the core of the first single-mode optical fiber 11, and the other corresponds to the focal point of light outputted to the second single-mode optical fiber 15 by the second GRIN optical fiber 14. When the strain occurs in the target, deformation such as bending occurs in the sensor module 1 as shown in FIG. 4. Accordingly, the focal point (or the "focal region") formed on the second single-mode optical fiber 15 by the second GRIN optical fiber 14 gets deviated as much as the displacement $\Delta d$ from the center of the core of the second single-mode optical fiber 15 to the side. Since the optical fiber receives only light input to the core, light input to the cladding is lost outside. Accordingly, in the second light input to the sensor module 1, only light forming the focal point in the core of the second single-mode optical fiber 15 is transmitted to the second detector 7. With the increasing strain, light losses out of the optical fiber increase, and thus light intensity measurements by the second detector 7 decrease. As described below, the curvature occurred in the sensor module 1 may be calculated from the measurements of the first and second detectors 6, 7, and from the calculated curvature, the strain in the target may be sensed.

FIG. 4 is a schematic diagram showing the curvature C occurring in the sensor module 1 of FIG. 3. As shown in FIG. 4, when an imaginary circle is drawn at the rate at which a curve L formed by the multi-mode optical fiber 13 is turning, a distance from two ends of the multi-mode optical fiber 13 to the center of the circle, i.e., the center of curvature, is the radius R of curvature. The angle θ, the curve L and the radius R of curvature have a relationship of the following Equation 1.

$$L = R \cdot \theta, C = 1/R, \theta = L \cdot C \quad \text{[Equation 1]}$$

FIG. 5 is a schematic diagram of circle B in FIG. 3 showing the displacement Δd occurred in the sensor module 1 of FIG. 3. The angle θ is the incident angle of the focal point formed on the focal plane of the second single-mode optical fiber 15. The displacement Δd may be calculated by multiplication of the focal length f and the tangent value of the angle θ as shown in the following Equation 2.

$$\Delta d = f \cdot \tan \theta \quad \text{[Equation 2]}$$

Hereinafter, embodiments of the strain sensor device 100 including the sensor module 1 of the present disclosure will be described with reference to the accompanying drawings.

Strain Sensor Device of First Embodiment

As shown in FIG. 1, the strain sensor device 100 according to an embodiment of the present disclosure may include a light source 3 to generate a laser light, a coupler 4 to receive the laser light and output it into first light and second light, a first detector 6 to receive the first light and measure the intensity of the first light, the sensor module 1, and a second detector 7 to receive the light outputted from the sensor module 1 and measure the intensity of the light.

The light source 3 may be a fiber-coupled laser connected to the coupler 4 through the optical fiber. In the embodiments of the present disclosure, the coupler 4 splits the laser light received from the light source 3 at a 50:50 ratio, but the above-described ratio may be differently set.

As shown in FIG. 1, the first detector 6 is connected to the coupler 4 with the optical fiber and receives the first light outputted from the coupler 4. The second detector 7 is connected to the sensor module 1 through the second single-mode optical fiber 15 and receives the light outputted from the second single-mode optical fiber 15. The first detector 6 receives the first light from the coupler 4 and measures the intensity, and the second detector 7 receives the light input to the core of the second single-mode optical fiber 15 of the sensor module 1 and measures the intensity.

In the embodiments of the present disclosure, the strain sensor device 100 may further include an information processing device 8 to store the light intensity measurements by the first detector 6 and the second detector 7 (or "the measurement data of the first and second detectors 6, 7"), and calculate the displacement Δd and curvature occurred in the sensor module 1 from the measurements. The information processing device 8 may be electrically connected to each of the first detector 6 and the second detector 7. The information processing device 8 may be an Analog-to-Digital Convertor (ADC).

The "ratio value" as used herein is defined as a ratio D2/D1 of the light intensity D2 measured by the second detector 7 to the light intensity D1 measured by the first detector 6. The ratio value indicates the coupling efficiency with which light is fed into the core of the optical fiber. The ratio value may be calculated by the following Equation 3.

$$\frac{D2}{D1} = e^{(-(\Delta d/w_0)^2)} = e^{(-(f \cdot \tan(L \cdot C)/w_0)^2)} \quad \text{[Equation 3]}$$

Here, is the half of the Mode Field Diameter (MFD) which is a diameter of optical energy propagating in the single-mode optical fiber.

The curvature C occurred in the sensor module 1 may be calculated by the following Equation 4 using the ratio value.

$$C = \frac{w_0 \sqrt{\ln(D2/D1)}}{f \cdot L} \quad (\text{Unit: } m^{-1}) \quad \text{[Equation 4]}$$

When the strain in the target increases, the displacement Δd at the sensor module 1 increases and the curvature C increases. In this instance, the light intensity measured by the second detector 7 decreases, and the ratio value, i.e., the coupling efficiency decreases.

Figure 6:
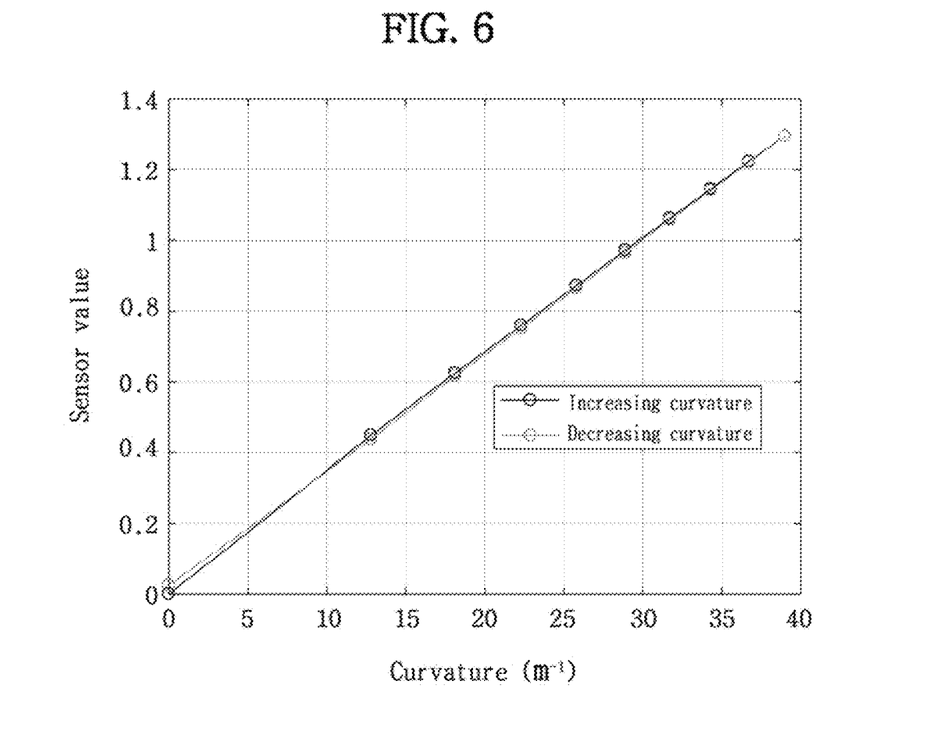
FIG. 6 shows curvature-sensor value graphs with increasing and decreasing curvature measured by a strain sensor device of embodiments of the present disclosure.

FIG. 6 shows curvature-sensor value graphs with the increasing and decreasing curvature C measured by the strain sensor device 100 of the embodiment of the present disclosure. The "sensor value" as used herein is defined as the natural log ln(D2/D1) of the ratio value.

The increasing curvature graph is a curvature-sensor value graph when the curvature of the sensor module 1 increases, and the decreasing curvature graph is a curvature-sensor value graph when the curvature of the sensor module 1 decreases. The curvature-sensor value indicates linearity, and in particular, the increasing curvature graph and the decreasing curvature graph almost match, so there is almost no hysteresis in the sensor value with the increasing or decreasing curvature C.

Figure 7:
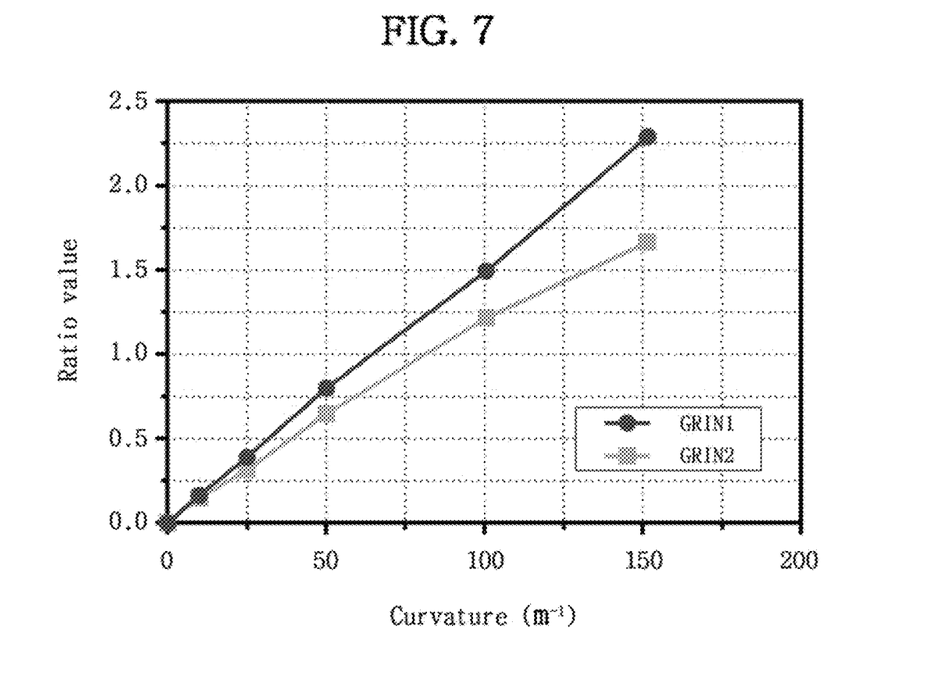
FIG. 7 shows curvature-ratio value graphs measured by a strain sensor device of embodiments of the present disclosure having GRIN optical fibers of different lengths.

FIG. 7 shows curvature-ratio value graphs measured by the strain sensor device 100 having the GRIN optical fibers of different lengths. The GR1N 1 graph and the GR1N 2 graph are curvature-ratio value graphs when the first and second GRIN optical fibers 12, 14 of the sensor module 1 are about 0.25 pitch and less than 0.25 pitch in length, respectively.

The ratio value to the curvature C, i.e., the slope of the graph, indicates the sensitivity of the sensor. As shown in FIG. 7, since the slope of the GRIN 1 graph is larger than the slope of the GRIN 2 graph, it can be seen that when the length of the first and second GRIN optical fibers 12, 14 is smaller than 0.25 pitch, the sensitivity of the sensor is lower. The length values of the first and second GRIN optical fibers 12, 14 applied to the graphs of FIG. 7 may be changed. As described above, in the embodiments of the present disclosure, the length and type of the component of the sensor module 1, namely, the optical fiber may be changed to realize the desired sensor specification.

Strain Sensor Device of Second Embodiment

Figure 8:
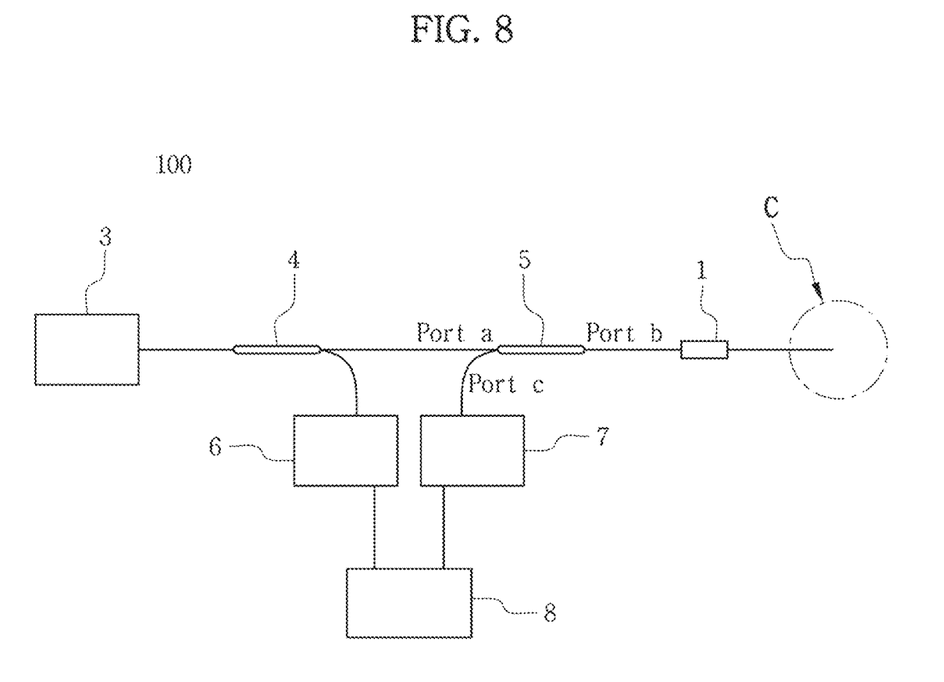
FIG. 8 is a schematic conceptual diagram of a strain sensor device according to a second embodiment of the present disclosure.
Figure 9:
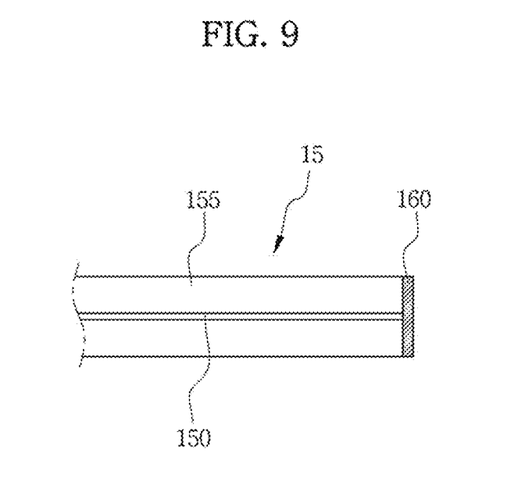
FIG. 9 is a schematic enlarged cross-sectional view of circle C showing the end of a second single-mode optical fiber of FIG. 8.

FIG. 8 is a schematic conceptual diagram of the strain sensor device 100 according to the second embodiment of the present disclosure, including the light source 3 and the detector disposed in the same direction. FIG. 9 is a schematic enlarged cross-sectional view of circle C showing the end of the second single-mode optical fiber 15 of FIG. 8.

In this embodiment, the strain sensor device 100 may further include a circulator 5 between the coupler 4 and the sensor module 1. The end of the second single-mode optical fiber 15 may be a free end having a reflection member 160 as shown in FIG. 9.

The reflection member 160 may be formed, for example, in the form of a reflection coating processed as shown in FIG. 9 at the end of the second single-mode optical fiber 15. The reflection coating may include a suitable material for the wavelength used in the sensor module 1 device. The reflection coating may be made of, for example, a metal and a polymer.

In this embodiment, the circulator 5 is a device configured to allow light input at 'Port a' to exit through 'Port b' and light input at the 'Port b' to exit through 'Port c'. The circulator 5 may include the 'Port a' and the 'Port c' at an end and the 'Port b' at the opposite end. In this embodiment, the 'Port a' is connected to the coupler 4 to receive the second light. The 'Port b' outputs the second light received through the 'Port a', and receives the reflected light returning through the sensor module 1. The 'Port c' is connected to the second detector 7 with the optical fiber to output the reflected light to the second detector 7.

Specifically, the second light outputted through the 'Port b' is outputted toward the end of the second single-mode optical fiber 15 through the sensor module 1. Subsequently, the reflected light generated by the reflection by the reflection member 160 provided at the end of the second single-mode optical fiber 15 is inputted to the 'Port b' again through the first single-mode optical fiber 11 via the sensor module 1. The structure in which the second light passes through the sensor module 1 is the same as described above.

Referring back to FIG. 7, since the strain sensor device 100 of the second embodiment has a structure of allowing light to pass through the sensor module 1 twice, in the case of implementation as shown in the GRIN 1 graph, the measurements by the second detector 7 may be too low. In this case, the measurement range of curvature C may become narrow due to too large light losses, but in the case of implementation as shown in the GRIN 2 graph, even though light passes through the sensor module 1 twice, light losses are not too large, and thus the measurement range of curvature C may be maintained.

Figure 10:
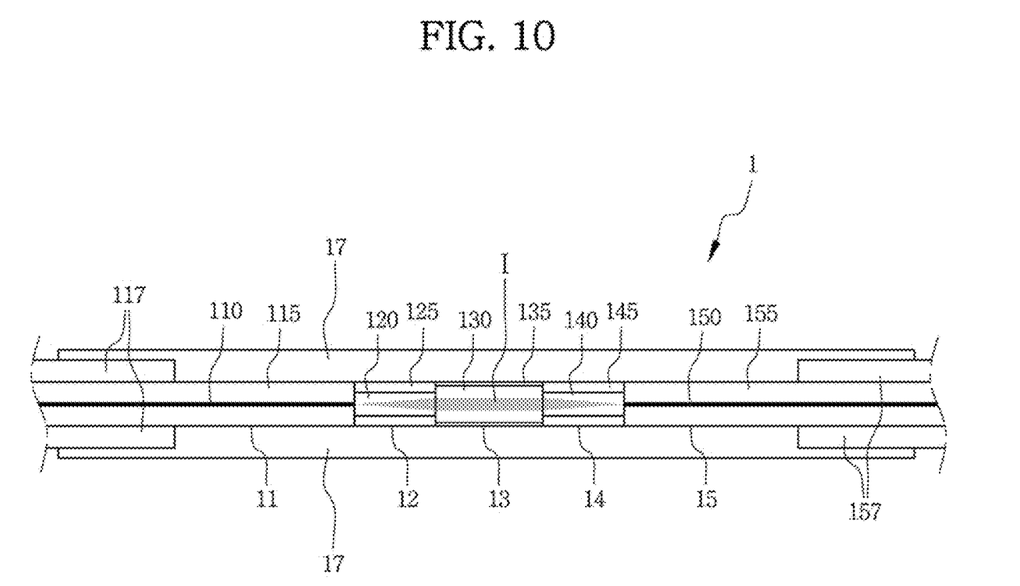
FIG. 10 is a schematic enlarged cross-sectional view of FIG. 1 showing the sensor module having a protective coating.

FIG. 10 is a schematic enlarged cross-sectional view of FIG. 1 showing the sensor module 1 having a protective coating 17 according to another embodiment of the present disclosure. To implement the sensor module 1 of the present disclosure, it is necessary to join different types of optical fibers, and in this process, the existing coating present in each optical fiber is removed. Accordingly, the core and cladding made of glass in the finished sensor module 1 may be vulnerable to external impacts. Accordingly, to prevent damage of the core and the cladding, the protective coating 17 which covers the outer circumference of the cladding may be further formed. The protective coating 17 may be made of a flexible material, for example, a polymer. Although FIG. 10 shows the protective coating in a cylindrical shape, this is provided for illustrative purposes, and the thickness and shape of the protective coating may be differently set.

Figure 11:
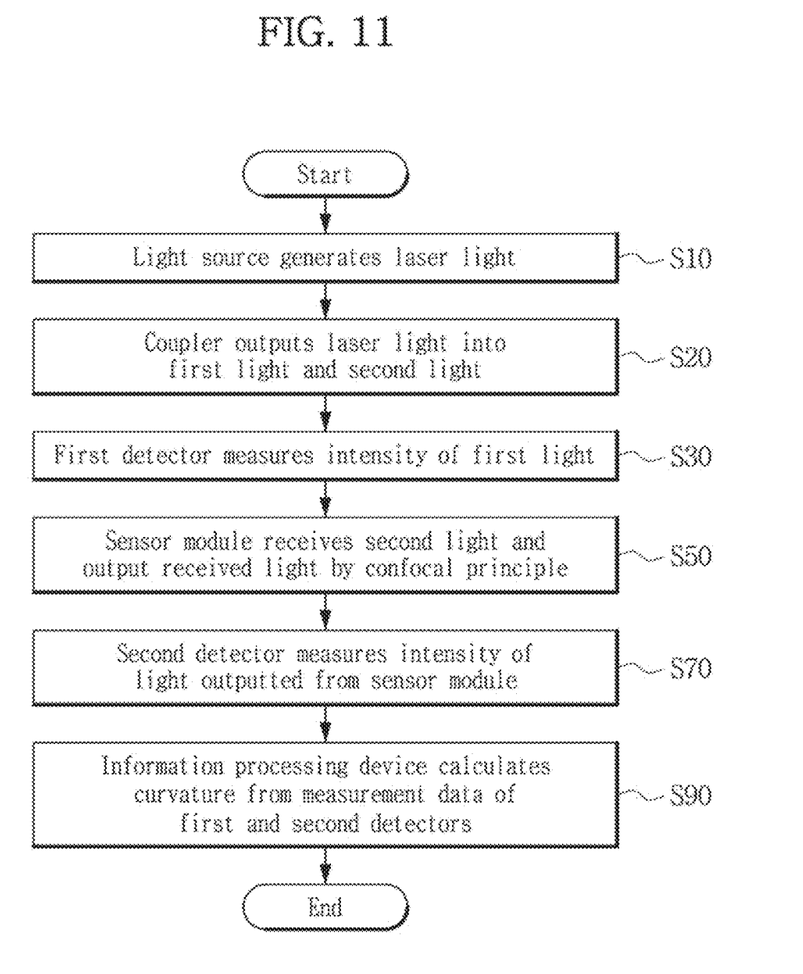
FIG. 11 is a flowchart of a method for sensing a strain in a target according to a first embodiment of the present disclosure.
Figure 12:
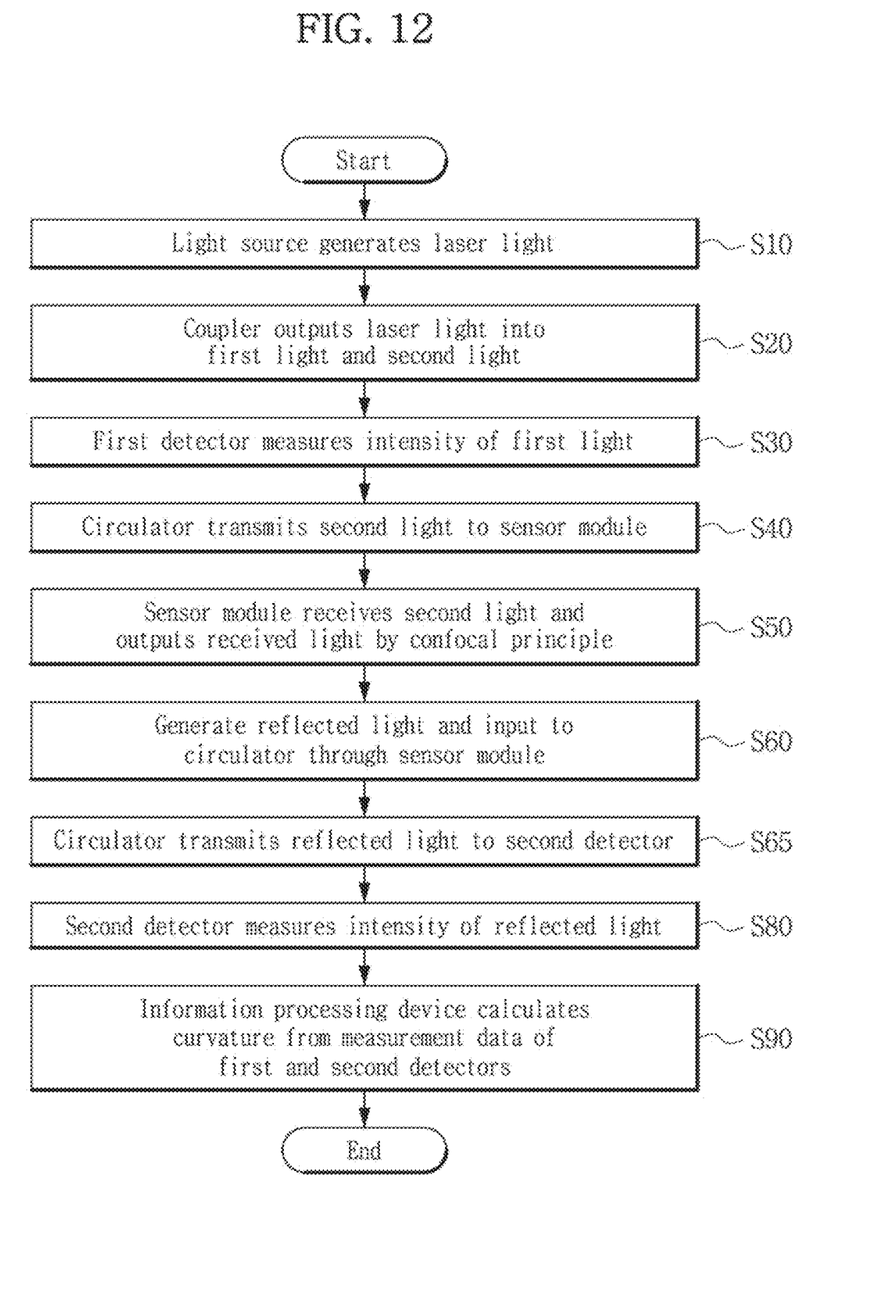
FIG. 12 is a flowchart of a method for sensing a strain in a target according to a second embodiment of the present disclosure.

FIGS. 11 and 12 show flowcharts of the methods for sensing the strain in the target using the strain sensor device 100 according to the first and second embodiments of the present disclosure, respectively. The methods are configured to sense the strain in the target using the above-described strain sensor device 100.

As shown in FIG. 11, the measurement method using the strain sensor device 100 of the first embodiment includes the steps of generating, by the light source 3, a laser light (S10), outputting, by the coupler 4, the laser light into first light and second light (S20), measuring, by the first detector 6, the intensity of the first light (S30), receiving, by the sensor module 1, the second light and outputting the received light by the confocal principle (S50), measuring, by the second detector 7, the intensity of the light outputted from the sensor module 1 (S70), and calculating, by the information processing device 8, the curvature C from the measurement data of the first and second detectors 6, 7 (S90). Here, the step S30 may not be performed prior to the steps S50 and S70, and may be performed subsequent to the step S50 or S70.

The step S50 is a step of transmitting the second light input to the first single-mode optical fiber 11 of the sensor module 1 to the second single-mode optical fiber 15, and outputting, by the second single-mode optical fiber 15, the input light forming the focal point in the core of the second single-mode optical fiber 15. More specifically, the step of transmitting, by the sensor module 1, the second light input to the first single-mode optical fiber 11 to the second single-mode optical fiber 15 may include receiving, by the first single-mode optical fiber 11, the second light and outputting it to the first GRIN optical fiber 12; outputting, by the first GRIN optical fiber 12, the received light to the multi-mode optical fiber 13 in the form of a parallel beam; receiving, by the multi-mode optical fiber, the parallel beam of light and outputting it to the second GRIN optical fiber 14; and outputting, by the second GRIN optical fiber 14, the received light to form the focal point in the second single-mode optical fiber 15.

As shown in FIG. 12, the measurement method using the strain sensor device 100 of the second embodiment includes the steps of generating, by the light source 3, a laser light (S10), outputting, by the coupler 4, the laser light into first light and second light (S20), measuring, by the first detector 6, the intensity of the first light (S30), transmitting, by the circulator 5, the second light to the sensor module 1 (S40), and receiving, by the sensor module 1, the second light and outputting the received light by the confocal principle (S50). Additionally, subsequently, this method includes the steps of generating reflected light and inputting it to the circulator 5 through the sensor module 1 (S60), transmitting, by the circulator 5, the reflected light to the second detector 7 (S65), measuring, by the second detector 7, the intensity of the light outputted from the sensor module 1 (S80), and calculating, by the information processing device 8, the curvature C from the measurement data of the first and second detectors 6, 7 (S90). Here, the step S30 may not be performed prior to the steps S40 to S80, and may be performed subsequent to any one of the steps S40 to S80.

The step S40 is a step of receiving, by the circulator 5, the second light through the 'Port a' and outputting it to the sensor module 1 through the 'Port b'. The step S50 has been described in the above-described measurement method using the strain sensor device 100 of the first embodiment, and is not repeatedly described herein.

In the step S60, specifically, the light inputted through the core of the second single- mode optical fiber 15 of the sensor module 1 is reflected by the reflection member 160 provided at the end, and the generated reflected light passes through the optical fibers of the sensor module 1 running from the second single-mode optical fiber 15 to the first single-mode optical fiber 11 in a sequential order and is inputted to the 'Port b ' of the circulator 5 again. The step S65 is a step in which the reflected light inputted through the post 'Port b' of the circulator 5 is outputted to the second detector 7 through the 'Port c' of of the circulator 5, and the step S80 is a step of receiving, by the second detector 7, the reflected light and measuring the intensity.

Although the present disclosure illustrate and describe the exemplary embodiments, the present disclosure is not limited to the above-described particular embodiments, and a variety of modifications may be made to the embodiments by those having ordinary skill in the technical field pertaining to the present disclosure without departing from the claimed subject matter of the appended claims, and such modified embodiments are not understood apart from the technical spirit of the present disclosure.

What is claimed is:

1. An optical fiber-based sensor module for sensing a strain in a target, comprising:
   a first single-mode optical fiber; a first gradient-index (GRIN) optical fiber; a multi-mode optical fiber; a second GRIN optical fiber; and a second single-mode optical fiber continuously coupled in an axial direction, wherein the first GRIN optical fiber is configured to receive light input to the first single-mode optical fiber and output it in a form of a parallel beam; the multi-mode optical fiber is configured to transmit the parallel beam of light to the second GRIN optical fiber; and the second GRIN optical fiber is configured to output the received light to form a focal point in the second single-mode optical fiber
   wherein a deformation of the target is detected using a displacement ($\Delta d$) of a focus formed on the second single-mode optical fiber by the second GRIN optical fiber from a center of a core of the second single-mode optical fiber in the axial direction.

2. The sensor module according to claim 1, wherein each optical fiber includes a core and a cladding which covers the core, the light input to the first single-mode optical fiber is transmitted through the cores of the optical fibers, and only light forming a focal region in the core of the second single-mode optical fiber is inputted to the second single-mode optical fiber.

3. The sensor module according to claim 2, wherein the optical fibers further include a flexible protective coating covering the cladding.

4. A strain sensor device using an optical fiber-based strain sensor module device for sensing a strain in a target, comprising:
   a light source to generate a laser light;
   a coupler connected to the light source to receive the laser light and output it into first light and second light;
   a first detector connected to the coupler to receive the first light and measure an intensity of the first light;
   a sensor module including a first single-mode optical fiber; a first GRIN optical fiber; a multi-mode optical fiber; a second GRIN optical fiber; and a second single-mode optical fiber continuously coupled in an axial direction, wherein the first single-mode optical fiber is connected to the coupler to receive the second light, and the second single-mode optical fiber receives at least part of the second light; and
   a second detector connected to the sensor module to receive the light outputted from the second single-mode optical fiber and measure an intensity of the light,
   wherein a deformation of the target is detected using a displacement ($\Delta d$) of a focus formed on the second single-mode optical fiber by the second GRIN optical fiber from a center of a core of the second single-mode optical fiber in the axial direction.

5. The strain sensor device according to claim 4, wherein the first GRIN optical fiber receives the light input to the first single-mode optical fiber and outputs it in a form of a parallel beam, the multi-mode optical fiber transmits the parallel beam of light to the second GRIN optical fiber, and the second GRIN optical fiber outputs the received light to form a focal point in the second single-mode optical fiber.

6. The strain sensor device according to claim 5, wherein each optical fiber includes a core and a cladding which covers the core, the light input to the first single-mode optical fiber is transmitted through the cores of the optical fibers, and only light forming the focal point in the core is inputted to the second single-mode optical fiber.

7. The strain sensor device according to claim 6, wherein the optical fibers further include a flexible protective coating configured to cover the cladding.

8. The strain sensor device according to claim 4, further comprising:
   an information processing device to calculate a curvature occurred in the sensor module by processing measurement data of the first detector and the second detector.

9. A strain sensor device using an optical fiber-based strain sensor module device for sensing a strain in a target, comprising:
   a light source to generate a laser light;
   a coupler connected to the light source to receive the laser light and output it into first light and second light;
   a first detector connected to the coupler to receive the first light and measure an intensity of the first light;
   a circulator including a 'Port a' connected to the coupler to receive the second light; a 'Port b' to which the light input to the 'Port a' is transmitted; and a 'Port c' to which the light input to the 'Port b' is transmitted;
   a sensor module including a first single-mode optical fiber; a first GRIN optical fiber; a multi-mode optical fiber; a second GRIN optical fiber; and a second single-mode optical fiber continuously coupled in an axial direction, wherein the first single-mode optical fiber is connected to the 'Port b' of the circulator to receive the second light and the second single-mode optical fiber is a free end type having a reflection member at an end; and
   a second detector connected to the sensor module to receive the light outputted from the second single-mode optical fiber and measure an intensity of the light,
   wherein a deformation of the target is detected using a displacement ($\Delta d$) of a focus formed on the second single-mode optical fiber by the second GRIN optical fiber from a center of a core of the second single-mode optical fiber in the axial direction.

10. A method for sensing a strain in a target using an optical fiber-based strain sensor module device, the method comprising:
    generating and outputting, by a light source, a laser light;
    outputting, by a coupler, the laser light into first light and second light;
    receiving, by a first detector, the first light and measuring an intensity of the first light;
    transmitting, by a sensor module, the second light input to a first single-mode optical fiber to a second single-mode optical fiber, through a first GRIN optical fiber; a multi-mode optical fiber and a second GRIN optical fiber continuously coupled in an axial direction;
    outputting, by the second single-mode optical fiber, the input light forming a focal point in a core of the second single-mode optical fiber; and
    receiving, by a second detector, the light outputted from the second single-mode optical fiber and measuring an intensity of the light, wherein a deformation of the target is detected using a displacement (Δd) of a focus formed on the second single-mode optical fiber by the second GRIN optical fiber from a center of a core of the second single-mode optical fiber in the axial direction.

11. The method according to claim 10, wherein transmitting, by the sensor module, the second light input to the first single-mode optical fiber to the second single-mode optical fiber comprises:
receiving, by the first single-mode optical fiber, the second light and outputting it to a first GRIN optical fiber;
outputting, by the first GRIN optical fiber, the received light to a multi-mode optical fiber in a form of a parallel beam;
receiving, by the multi-mode optical fiber, the parallel beam of light and outputting it to a second GRIN optical fiber; and
outputting, by the second GRIN optical fiber, the received light to form a focal point in the second single-mode optical fiber.

12. The method according to claim 10, further comprising:
calculating, by an information processing device, a curvature occurred in the sensor module by processing measurement data of the first detector and the second detector.

13. A method for sensing a strain in a target using an optical fiber-based strain sensor module device, the method comprising:
generating and outputting, by a light source, a laser light;
outputting, by a coupler, the laser light into first light and second light;
measuring, by a first detector, an intensity of the first light;
receiving, by a circulator, the second light through a 'Port a' and outputting it to a sensor module through a 'Port b';
transmitting, by the sensor module, the second light input to a first single-mode optical fiber to a second single-mode optical fiber, through a first GRIN optical fiber; a multi-mode optical fiber and a second GRIN optical fiber continuously coupled in an axial direction;
outputting, by the second single-mode optical fiber, the input light forming a focal point in the core of the second single-mode optical fiber;
allowing the light outputted from the second single-mode optical fiber to be reflected by a reflection member, pass through the sensor module and be inputted again through the 'Port b';
outputting, by the circulator, the reflected light inputted through the 'Port b' to a 'Port c'; and
receiving, by a second detector, the reflected light and measuring an intensity of the reflected light,
wherein a deformation of the target is detected using a displacement (Δd) of a focus formed on the second single-mode optical fiber by the second GRIN optical fiber from a center of a core of the second single-mode optical fiber in the axial direction.

* * * * *